Inventor

John Maxwell

Patented Oct. 26, 1954

2,692,805

UNITED STATES PATENT OFFICE 2,692,805

SPACER SLEEVE FOR THE BEARING ASSEMBLIES OF VEHICLE TORQUE TUBE ASSEMBLIES

John Maxwell, Elizabeth, N. J.

Application May 7, 1951, Serial No. 224,938

2 Claims. (Cl. 308—189)

This invention relates to new and useful improvements in the torque tube assemblies of vehicles and the primary object of the present invention is to provide a device that will greatly facilitate and simplify the assembly of pinion bearings and drive shaft into the torque tube housings of vehicles.

Another very important object of the present invention is to provide a spacer sleeve adapted to embrace a shaft and which is interposed between the bearing assemblies of a torque tube assembly to hold an abutment collar for one of the bearing assemblies against sliding movement during the installation or reinstallation of the bearing assemblies.

A further object of the present invention is to provide a device of the aforementioned character that is quickly and readily applied to or removed from the drive shaft of a torque tube assembly in a convenient manner to prevent lateral movement of the bearing assemblies of a torque tube assembly.

A still further aim of the present invention is to provide a spacer sleeve having the above desirable characteristics that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
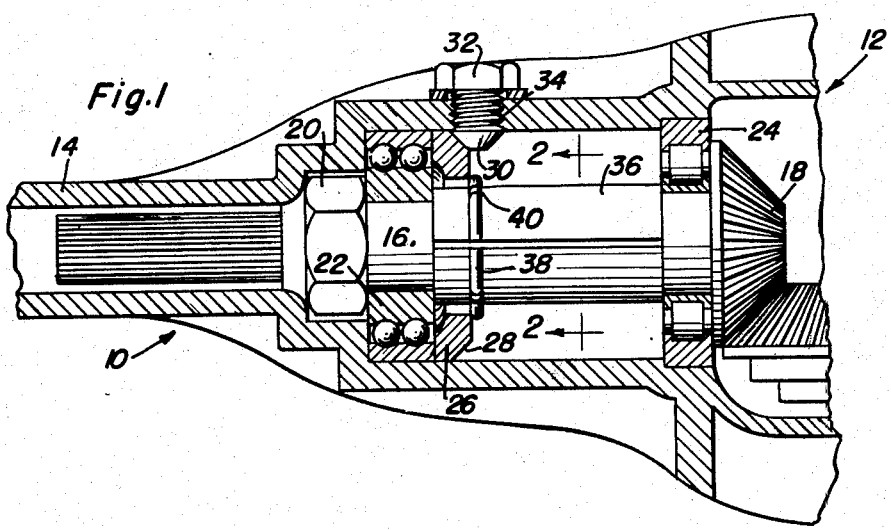
Figure 1 is a fragmentary longitudinal vertical sectional view of a vehicle torque tube assembly applied to a differential and showing the present invention in place.
Figure 2:
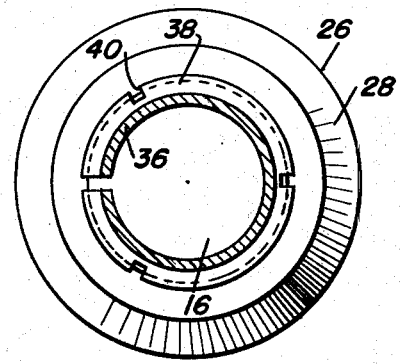
Figure 2 is an enlarged transverse vertical sectional view taken substantially on the plane of section line 2—2 of Figure 1; and, Figure 3 is a perspective view of the present invention per se.
Figure 3:
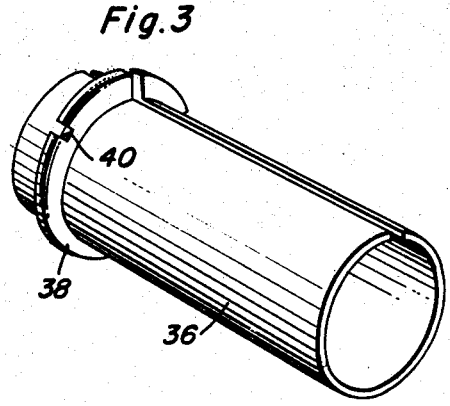

Referring now to the drawings in detail, wherein for the purpose of illustration, there is disclosed a preferred embodiment of the present invention, the numeral 10 represents a vehicle torque tube assembly that is secured to a differential 12.

The torque tube assembly 10 includes a housing 14 that receives a drive shaft 16 having a pinion 18 on one end thereof. A nut 20 is received on the shaft 16 and abuts a double row bearing assembly 22. A further roller bearing assembly 24 is also received on the shaft 16 and abuts the pinion 18.

A cast iron bearing retaining collar 26 embraces the shaft 16, abuts the bearing assembly 22 and includes a beveled edge or sloping surface 28 that will contact the frusto-conical end portions 30 of a plurality of circumferentially spaced locating and holding screws 32 that are threaded in openings 34 in the housing 14 in order to urge the collar 26 against the bearing assembly 22.

The present invention comprises a split spacer sleeve 36 that yieldingly embraces the shaft 16 and which is interposed between the bearing assemblies 22 and 24. The ends of the sleeve 36 bear against the inner face of the bearing assemblies 22 and 24 to prevent movement of the bearing assemblies toward each other.

Integrally formed with the spacer sleeve 36, adjacent the end thereof that bears against the bearing assembly 22, is an annular shoulder or abutment 38 that will bear against the collar 26 to urge the collar against the bearing assembly 22.

A plurality of circumferentially spaced passages, openings or notches 40 are provided in the abutment 38 and permit a lubricant to pass therethrough to contact the bearing assembly 22.

In practical use of the present invention, the abutment 38 will positively force the collar 22 against the bearing assembly 22 so that the locating and holding screws 32 can be threaded in the openings 34 to correctly engage the surface 28.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a torque tube housing for vehicles including a shaft mounted within the housing, first and second bearings mounted on the shaft, a retaining collar slidably received on the shaft and abutting said first bearing, and a locating and holding screw carried by the housing and urging the collar against the first bearing; the improvement of which comprises a sleeve member embracing the shaft and having one end engaging the second bearing and its other end received in the collar, said member being interposed between the collar and the second bearing and having an external shoulder engaging the collar and holding the collar against sliding movement while assembling the bearings in the torque tube housing, said shoulder including a series of circumferentially spaced ribs, the space between adjacent ribs constituting passage means for a lubricant.

2. In a torque tube housing for vehicles including a shaft mounted within the housing, first and second bearings mounted on the shaft, a retaining collar slidably received on the shaft and abutting said first bearing, and a locating and holding screw carried by the housing and urging the collar against the first bearing, the improvement of which comprises a split resilient sleeve yieldingly embracing the shaft and interposed between the collar and the second bearing, said sleeve having one end engaging the second bearing and its other end receiving within the collar, and a continuous abutment on the outer periphery of the sleeve intermediate its ends bearing against the collar and urging the collar against the first bearing to prevent sliding movement of the collar during installation of the locating and holding screws and a plurality of circumferentially spaced lubricant passages provided in said abutment.

References Cited in the file of this patent

UNITED STATES PATENTS

| Number | Name | Date |
|---|---|---|
| 1,887,405 | Fogel | Nov. 8, 1932 |
| 2,393,735 | Beezley | Jan. 29, 1946 |
| 2,467,416 | Worel | Apr. 19, 1949 |